US008815456B2

(12) United States Patent
Shigehisa

(10) Patent No.: US 8,815,456 B2
(45) Date of Patent: Aug. 26, 2014

(54) FUEL CELL SYSTEM

(75) Inventor: Takashi Shigehisa, Kirishima (JP)

(73) Assignee: Kyocera Corporation, Kyoto (JP)

( * ) Notice: Subject to any disclaimer, the term of this patent is extended or adjusted under 35 U.S.C. 154(b) by 1764 days.

(21) Appl. No.: 11/572,258

(22) PCT Filed: Jul. 15, 2005

(86) PCT No.: PCT/JP2005/013520
§ 371 (c)(1),
(2), (4) Date: May 23, 2007

(87) PCT Pub. No.: WO2006/009264
PCT Pub. Date: Jan. 26, 2006

(65) Prior Publication Data
US 2007/0281115 A1    Dec. 6, 2007

(30) Foreign Application Priority Data

Jul. 21, 2004 (JP) ................................. 2004-213419

(51) Int. Cl.
*H01M 8/04* (2006.01)
*H01M 8/06* (2006.01)
*H01M 8/12* (2006.01)
*H01M 8/24* (2006.01)

(52) U.S. Cl.
CPC .......... *H01M 8/04089* (2013.01); *Y02E 60/525* (2013.01); *H01M 8/04223* (2013.01); *H01M 8/0488* (2013.01); *H01M 2008/1293* (2013.01); *H01M 8/0606* (2013.01); *H01M 8/243* (2013.01); *H01M 8/04589* (2013.01); *Y02E 60/50* (2013.01); *H01M 8/04753* (2013.01)
USPC ........................................ 429/429; 429/443

(58) Field of Classification Search
USPC ............................................................. 429/429
See application file for complete search history.

(56) References Cited

U.S. PATENT DOCUMENTS 5,856,034 A * 1/1999 Huppmann et al. .......... 429/415
5,985,474 A * 11/1999 Chen et al. .................... 429/410
(Continued)

FOREIGN PATENT DOCUMENTS

| JP | 61-239567 | 10/1986 |
| JP | 2002-329519 | 11/2002 |

(Continued)

*Primary Examiner* — Ula C Ruddock
*Assistant Examiner* — Jacob Marks
(74) *Attorney, Agent, or Firm* — DLA Piper LLP (US)

(57) ABSTRACT

A fuel cell system comprising a generation chamber, a plurality of fuel cells arranged in the generation chamber, fuel gas feeding means for feeding a fuel gas to the fuel cells, oxygen-containing gas feeding means for feeding an oxygen-containing gas to the fuel cells, power converter means for converting the DC output of the fuel cells into an alternating current, power control means for controlling the electric power output to the power converter means from the fuel cells, and generation control means for controlling the flow rate of the fuel gas fed to the fuel cells and the flow rate of the oxygen-containing gas fed to the fuel cells. A fuel gas buffer amount specific to the fuel cells is not smaller than a fuel gas amount that is needed within a maximum period of increase-needing time that is necessary until the flow rate of the fuel gas increases to a required amount when the amount of increase in the flow rate of the fuel gas is set to be a maximum. The generation control means sets the flow rate of the fuel gas and the flow rate of the oxygen-containing gas based on an electric current of the fuel cells.

4 Claims, 4 Drawing Sheets

(56) References Cited

U.S. PATENT DOCUMENTS

2003/0190510 A1* 10/2003 Musselman et al. ............ 429/23
2004/0005488 A1* 1/2004 Faris et al. ...................... 429/23
2004/0038097 A1* 2/2004 Bunker ........................... 429/22

FOREIGN PATENT DOCUMENTS

| JP | 2003-257458 | | 9/2003 |
| JP | 2004-063368 | * | 2/2004 |
| JP | 2004-111238 | | 4/2004 |

\* cited by examiner

FUEL CELL SYSTEM

TECHNICAL FIELD

The present invention relates to a fuel cell system equipped with power control means for controlling the amount of electric power produced by fuel cells and with generation control means for controlling the flow rate of a fuel gas and the flow rate of an oxygen-containing gas fed to the fuel cells.

BACKGROUND ART

As is widely known, a fuel cell system has been proposed and placed in practical use to generate electricity by putting a hydrogen-rich fuel gas and an oxygen-containing gas which may be the air to the electrode reaction. A representative example of the fuel cell system includes a generation chamber, a plurality of fuel cells arranged in the generation chamber, fuel gas feeding means for feeding a fuel gas to the fuel cells, oxygen-containing gas feeding means for feeding an oxygen-containing gas to the fuel cells, and power converter means for converting a DC output of the fuel cells into an alternating current. The power converter means feeds AC power to the load such as electric appliances in a general household in cooperation with a system power source such as a commercial power source. The fuel cell system further includes power control means for suitably controlling the amount of electric power output to the power converter means from the fuel cells depending upon variations in the load, and generation control means for controlling the generation of the fuel cells by controlling the flow rate of the fuel gas and the flow rate of the oxygen-containing gas fed to the fuel cells. It is desired that the amount of generation of the fuel cells is suitably controlled depending upon variations in the load. Accordingly, the power control means and the generation control means work in cooperation with each other.

When the load increases and, hence, the amount of output power of the fuel cells must be increased, the amount of output power is instantaneously increased in response to an increase instruction involving, however, a time lag of several milliseconds. On the other hand, the fuel gas to be fed to the fuel cells is obtained from a fuel gas to be reformed, such as a city gas that must be reformed into a hydrogen-rich fuel gas. Therefore, the flow rate of the fuel gas cannot be instantaneously increased despite of having received the increase instruction, and increases involving a time lag of several seconds. Therefore, when the amount of output power must be increased at a large rate, the fuel gas becomes in short supply in the fuel cells giving rise to the occurrence of a so-called fuel depletion phenomenon. If the fuel depletion phenomenon occurs, the electric power is not obtained as required and, besides, the fuel cells are deteriorated.

To avoid the occurrence of the above fuel depletion phenomenon, JP-A-7-14598 discloses a fuel cell system wherein when the load has increased, the flow rate of the fuel gas and the flow rate of the oxygen-containing gas are readily increased in response thereto, but the amount of the output power is increased being suitably lagged behind. Further, JP-A-7-57753 discloses a fuel cell system wherein when the load has increased, the rate of increasing the output power is limited to be not larger than a predetermined value to thereby avoid the occurrence of the fuel depletion phenomenon.

However, the following problems are involved in the conventional fuel cell systems which are designed to avoid the occurrence of the fuel depletion phenomenon as described above. Namely, the rate of following up the variations in the load becomes relatively sluggish since the output power is increased in a delayed manner or the rate of increasing the output power is limited to be not larger than a predetermined value. When the load varies vigorously, the electric power in many cases is generated without properly following the variation in the load, and the effective generation efficiency decreases considerably. Further, controlling the output power by the power control means must be suitably related to controlling the flow rate of the fuel gas and the flow rate of the oxygen-containing gas by the generation control means, and it becomes necessary to execute these control operations systematically. Therefore, when it is desired to change the load for which the fuel cell system is to be provided or when the fuel cell system is to be added to a single load, the control system as a whole must be greatly modified.

DISCLOSURE OF THE INVENTION

It is, therefore, a principal object of the present invention to provide a novel and improved fuel cell system which is capable of sufficiently quickly controlling the output power and of properly controlling the flow rate of the fuel gas and the flow rate of the oxygen-containing gas in response to a variation in the load without permitting the occurrence of fuel depletion phenomenon.

Another object of the present invention is to provide a novel and improved fuel cell system which is capable of coping with the requirements very easily without requiring a great modification in the control system even when it is desired to change the load for which the fuel cell system is to be provided or when the fuel cell system is to be added to a single load.

Through their keen study, the present inventors have discovered the fact that the occurrence of fuel depletion phenomenon can be avoided even when the output power of the fuel cells is quickly controlled to meet a variation in the load if the flow rate of the fuel gas and the flow rate of the oxygen-containing gas are set based on an electric current of the fuel cells by selecting a fuel gas buffer amount specific to the fuel cells to be not smaller than a fuel gas amount that is needed within a maximum period of increase-needing time until the flow rate of the fuel gas is increased to a required amount when the amount of increase in the flow rate of the fuel gas is set to be a maximum and have, thus, accomplished the above principal object. The expression "fuel gas buffer specific to the fuel cells" appearing in this specification stands for the fuel gas amount present in the fuel cells (e.g., in the gas passages formed in the electrode support board) due to the constitution of the fuel cells themselves in the normal state. In particular, when the fuel cells are of the solid electrolyte type, the fuel gas buffer amount can be increased to a sufficient degree without involving any problem.

That is, in order to achieve the above principal object of the present invention, there is provided a fuel cell system comprising a generation chamber, a plurality of fuel cells arranged in the generation chamber, fuel gas feeding means for feeding a fuel gas to the fuel cells, oxygen-containing gas feeding means for feeding an oxygen-containing gas to the fuel cells, power converter means for converting the DC output of the fuel cells into an alternating current, power control means for controlling the electric power output to the power converter means from the fuel cells, and generation control means for controlling the flow rate of the fuel gas fed to the fuel cells and the flow rate of the oxygen-containing gas fed to the fuel cells, the electric power being generated by the electrode reaction in the fuel cells, wherein:

a fuel gas buffer amount specific to the fuel cells is not smaller than a fuel gas amount that is needed within a maximum period of increase-needing time that is necessary until the flow rate of the fuel gas increases to a required amount when the amount of increase in the flow rate of the fuel gas is set to be a maximum; and the generation control means sets the flow rate of the fuel gas and the flow rate of the oxygen-containing gas based on an electric current of the fuel cells.

In a preferred embodiment, the fuel cells are of the solid electrolyte type. The fuel gas feeding means includes reforming means, to-be-reformed gas feeding means for feeding, to the reforming means, a fuel gas that is to be reformed into a hydrogen-rich fuel gas, and water feeding means for feeding water to the reforming means, wherein the generation control means controls the flow rate of the to-be-reformed fuel gas fed to the reforming means and the flow rate of water fed to the reforming means to thereby control the flow rate of the fuel gas. Desirably, the power control means controls the electric power output from the fuel cells relying upon neither the flow rate of the fuel gas fed to the fuel cells nor the flow rate of the oxygen-containing gas fed to the fuel cells, which are controlled by the generation control means. In this case, the generation control means and the power control means can be constituted independently from each other to achieve the above another object. When the electric power set by the power control means is greater than the electric power generated by the fuel cells by more than a predetermined amount, it is desired that the generation control means sets the flow rate of the fuel gas to a predetermined maximum value. It is desired that the flow rate of the fuel gas set by the generation control means is not smaller than a predetermined minimum amount and that the flow rate of the oxygen-containing gas set by the generation control means, too, is not smaller than a predetermined minimum amount. It is desired that when a temperature exceeds a predetermined value at a predetermined portion in the generation chamber, the generation control means sets the flow rate of the oxygen-containing gas to a predetermined maximum value. It is desired that the power control means maintains the DC voltage of the fuel cells output to the power converter means to be not smaller than one-half the open-circuit electromotive voltage.

BEST MODE FOR CARRYING OUT THE INVENTION

A preferred embodiment of the fuel cell system constituted according to the present invention will be described below in further detail with reference to the accompanying drawings.

Figure 1:
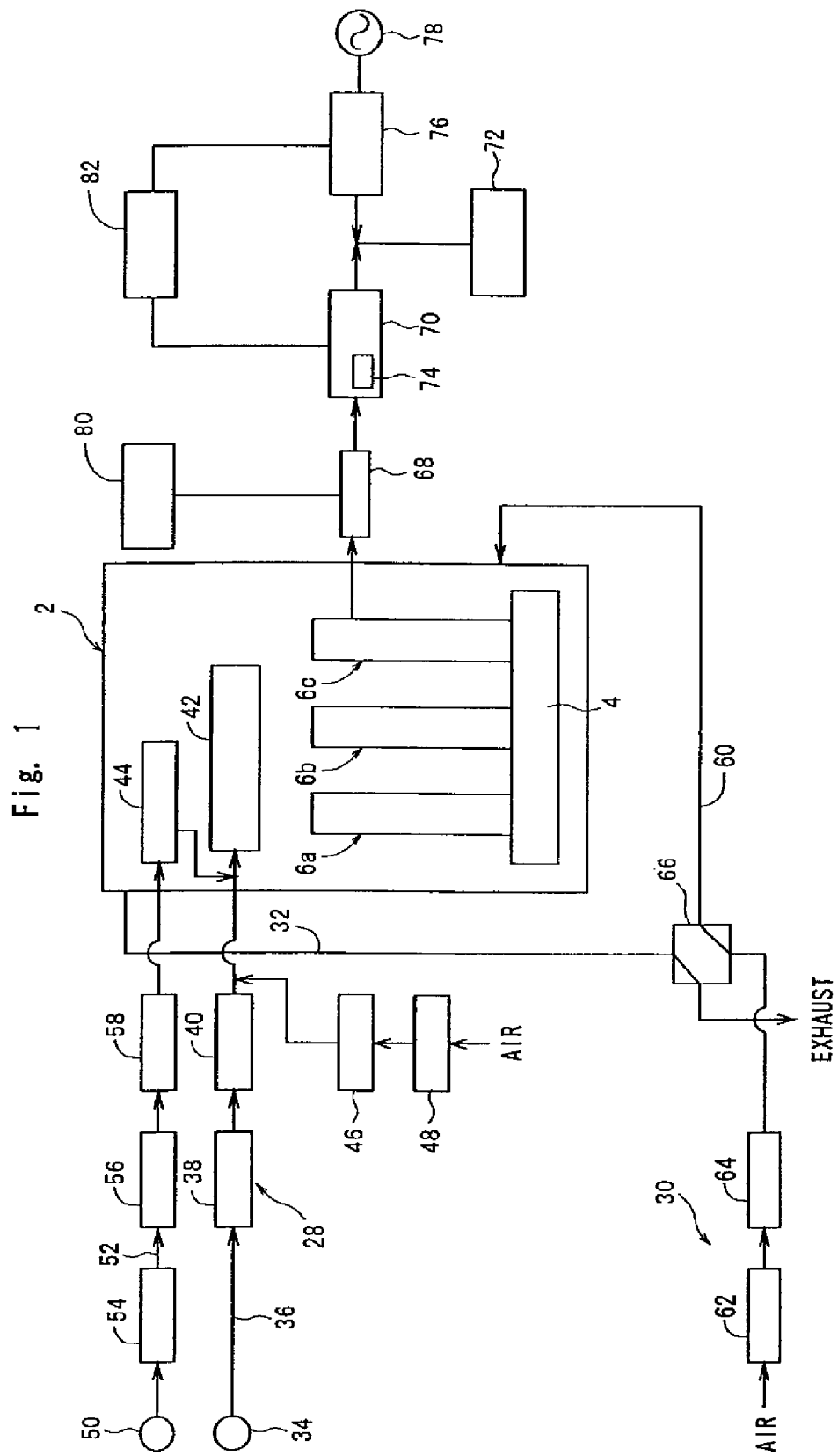
FIG. 1 is a view schematically illustrating the principal constituent elements in a preferred embodiment of a fuel cell system constituted according to the present invention.

FIG. 1 simply illustrates the principal constituent elements of the fuel cell system constituted according to the present invention. The fuel cell system that is illustrated includes a generation chamber 2 which may be of a rectangular parallelepiped shape. It is desired that the generation chamber 2 is constituted by an outer frame made of a heat resisting metal plate and a heat insulating member arranged along the inner surfaces of the outer frame. A fuel gas tank 4 of the shape of a box is arranged in the lower part of the generation chamber 2. Fuel cell stacks 6a, 6b and 6c are arranged on the fuel gas tank 4. If described with reference to FIG. 1 as well as FIG. 2, the fuel cell stacks 6a, 6b and 6c are, respectively, constituted by a plurality of (five in the illustrated embodiment) fuel cells 8 of the solid electrolyte type that are slenderly extending in the vertical direction, i.e., in the up-and-down direction in FIG. 1 or in a direction perpendicular to the surface of the paper in FIG. 2, and are arranged in a direction perpendicular to the surface of the paper in FIG. 1 or in the up-and-down direction in FIG. 2.

The fuel cells 8 are, respectively, constituted by an electrode support board 10, a fuel electrode layer 12 (anode) which is an inner electrode layer, a solid electrolyte layer 14 (cathode), an oxygen electrode layer 16 which is an outer electrode layer and an interconnector 18. The electrode support board 10 is a plate-like piece which slenderly extends in the vertical direction, and has both surfaces which are flat and both side surfaces which are of a semicircular shape. The electrode support board 10 has a plurality of (four in the illustrated embodiment) gas passages 20 that penetrate therethrough in the vertical direction. The electrode support boards 10 are joined to the upper wall surface of the fuel gas tank 4 by using, for example, a ceramic adhesive having excellent heat resisting property. A plurality of (fifteen in the illustrated embodiment) slits (not shown) are formed in the upper wall surface of the fuel gas tank 4 extending in the right-and-left direction in FIG. 1 and in the right-and-left direction maintaining a distance perpendicularly to the surface of the paper. Gas passages 20 formed in the electrode support boards 10 are communicated with these slits and are, therefore, communicated with the interior of the fuel gas tank 4. The interconnector 18 is arranged on one surface of the electrode support board 10 (on the upper surface of the fuel cell stack 6a in FIG. 2). The fuel electrode layer 12 is arranged on the other surface of the electrode support board 10 (on the lower surface of the fuel cell stack 6a in FIG. 2) and on both side surfaces thereof, and is joined at both ends thereof to both ends of the interconnector 18. The solid electrolyte layer 14 is so arranged as to cover the whole fuel electrode layer 12, and is joined at both ends thereof to both ends of the interconnector 18. The oxygen electrode layer 16 is arranged on the main portion of the solid electrolyte layer 14, i.e., on a portion covering the other surface of the electrode support board 10, and is positioned facing the interconnector 18 with the electrode support board 10 held therebetween.

Collector members 22 are arranged among the fuel cells 8 neighboring to one another in the fuel cell stacks 6a, 6b and 6c, and are connecting the interconnector 18 of one fuel cell 8 to the oxygen electrode layer 16 of another fuel cell 8. The collector members 22 are also arranged at both ends of the fuel cell stacks 6a, 6b and 6c, i.e., on the one surface and on the other surface of the fuel cells 8 positioned at the upper ends and at the lower ends thereof in FIG. 2. The fuel cell stacks 6a and 6b have the collector members 22 that are connected together through a conducting member 24 at the lower ends thereof in FIG. 2, while the fuel cell stacks 6b and 6c have the collector members 22 that are connected together through a conducting member 24 at the upper ends thereof in FIG. 2. Further, the fuel cell stack 6a has the collector member 22 that is connected to a terminal member 26 at the upper end in FIG. 2, and the fuel cell stack 6c has the collector member 22 that is connected to a terminal member 26 at the lower end in FIG. 2. Thus, the fuel cells 8 are all electrically connected in series, and the terminal members 26 are present at both ends of the series connection.

If further described with reference to FIG. 1, the fuel cell system further includes fuel gas feeding means 28 for feeding the fuel gas to the fuel cell stacks 6a, 6b and 6c, oxygen-containing gas feeding means 30 for feeding the oxygen-containing gas to the fuel cell stacks 6a, 6b and 6c, and exhaust gas discharging means 32 for discharging the exhaust gas from the generation chamber 2.

The fuel gas feeding means 28 includes a city gas feeder line or a feeder line 36 connected to a to-be-reformed fuel gas supply 34 which may be a propane gas cylinder, and the feeder line 36 includes a cut-off valve 38 and flow rate control means 40 disposed therein. The fuel gas feeding means 28 includes reforming means 42 arranged at an upper end portion of the generation chamber 2 and vaporizing means 44 attached to the reforming means 42. The reforming means 42 has a reforming chamber (not shown) containing a known catalyst which is necessary for partly reforming and steam-reforming the fuel gas. The feeder line 36 extends into the generation chamber 2 and is connected to the inlet of the reforming means 42. The outlet of the reforming means 42 is connected to the fuel gas tank 4 via a communication passage (not shown) formed in the side wall of the generation chamber 2. Blower means 48 is connected, through a cut-off valve 46, to the feeder line 36 downstream of the flow rate control means 40. The fuel gas feeding means 28 further includes a feeder line 52 connected to a water supply 50 which may be a city water feeder line, and the feeder line 52 includes a cut-off valve 54, water purifying means 56 and flow rate control means 58. The feeder line 52, too, extends into the generation chamber 2 and is connected to the inlet of the vaporizing means 44. The outlet of the vaporizing means 44 is connected to the feeder line 36 on the upstream of the reforming means 42 and is, therefore, connected to the reforming means 42 via the feeder line 36. The to-be-reformed fuel gas which may be a city gas or a propane gas is fed to the reforming means 42 through the feeder line 36, is reformed into a hydrogen-rich fuel gas through the reforming means 42, is fed into the fuel gas tank 4, and is fed to the fuel cells 8 or, more closely, to the gas passages 20 formed in the electrode support boards 10. The blower means 48 is operated, as required, at the start (or, further closely, is operated until the temperature in the generation chamber 2 is sufficiently elevated to assume a state where the vaporizing means 44 is allowed to execute the predetermined vaporization) to thereby feed the air to the reforming means 42. When the fuel cell system is normally operating (i.e., when the temperature in the generation chamber 2 is sufficiently elevated assuming a state where the vaporizing means 44 is allowed to execute the predetermined vaporization), water which may be the city water is subjected to a predetermined purification treatment through the water purifying means 56, and is fed to the vaporizing means 44 where steam is formed and is fed to the reforming means 42 to effect the so-called steam reforming.

The oxygen-containing gas feeding means 30 includes a feeder line 60 extending into the generation chamber 2. Blower means 62 is arranged at an upstream end of the feeder line 60. The feeder line 60 further has a flow meter 64 and heat-exchanging means 66 arranged therein. When the blower means 62 is operated, the oxygen-containing gas which may be the air is fed into the generation chamber 2 flowing through the feeder line 60, diffused in the generation chamber 2 through oxygen-containing gas diffusing means (not shown) arranged in the generation chamber 2 and is, thus, fed into the fuel cells 8.

As will be described later, further, when the temperature in the generation chamber 2 becomes higher than a required temperature as a result of burning the fuel gas in the generation chamber 2, the hydrogen-rich fuel gas is fed from the fuel gas tank 4 into the gas passages 20 in the electrode support boards 10 of the fuel cells 8, and rises through the gas passages 20. At the same time, further, the oxygen-containing gas is diffused in the generation chamber 2. In the fuel cells 8, therefore, the electrode reaction of the following formula (1) takes place on the oxygen electrode layers 16 while the electrode reaction of the following formula (2) takes place on the fuel electrode layers 12 to generate electricity. The generated electric power is taken out through a pair of terminal members 26.

Oxygen electrodes: $\frac{1}{2}O_2 + 2e^- \rightarrow O^{2-}$ (solid electrolyte) (1)

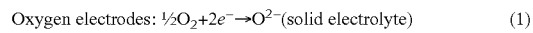

Fuel electrodes: $O^{2-}$ (solid electrolyte) $+ H_2 \rightarrow H_2O + 2e^-$ (2)

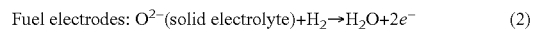

Of the fuel gas flowing through the gas passages 20 in the electrode support boards 10 of the fuel cells 8, the fuel gas that was not used for the electrode reaction flows into the generation chamber 2 from the upper ends of the electrode support boards 10 and burns as it flows in. Of the oxygen in the oxygen-containing gas diffused in the generation chamber 2, the oxygen that was not used for the electrode reaction is used for the burning. The temperature in the generation chamber 2 becomes as high as, for example, about 800 to about 1000° C. due to the generation of electricity in the fuel cells 8 and the burning of the fuel gas. The exhaust gas discharging means 32 is constituted by a discharge line extending from the generation chamber 2, the discharge line extending through the heat-exchanging means 66. In the heat-exchanging means 66, therefore, the heat of the exhaust gas is conducted to the oxygen-containing gas that is fed into the generation chamber 2. As desired, the heat of the exhaust gas may be utilized for heating the water in a hot water supply system (not shown).

Here, the above-mentioned constitution and action of the illustrated fuel cell system are not to constitute novel features of the fuel cell system contemplated by the present invention, and may be those which are substantially the same as the fuel cell system disclosed in, for example, JP-A-2005-5213. Therefore, details thereof should be referred to in JP-A-2005-5213 and are not described in this specification.

Figure 2:
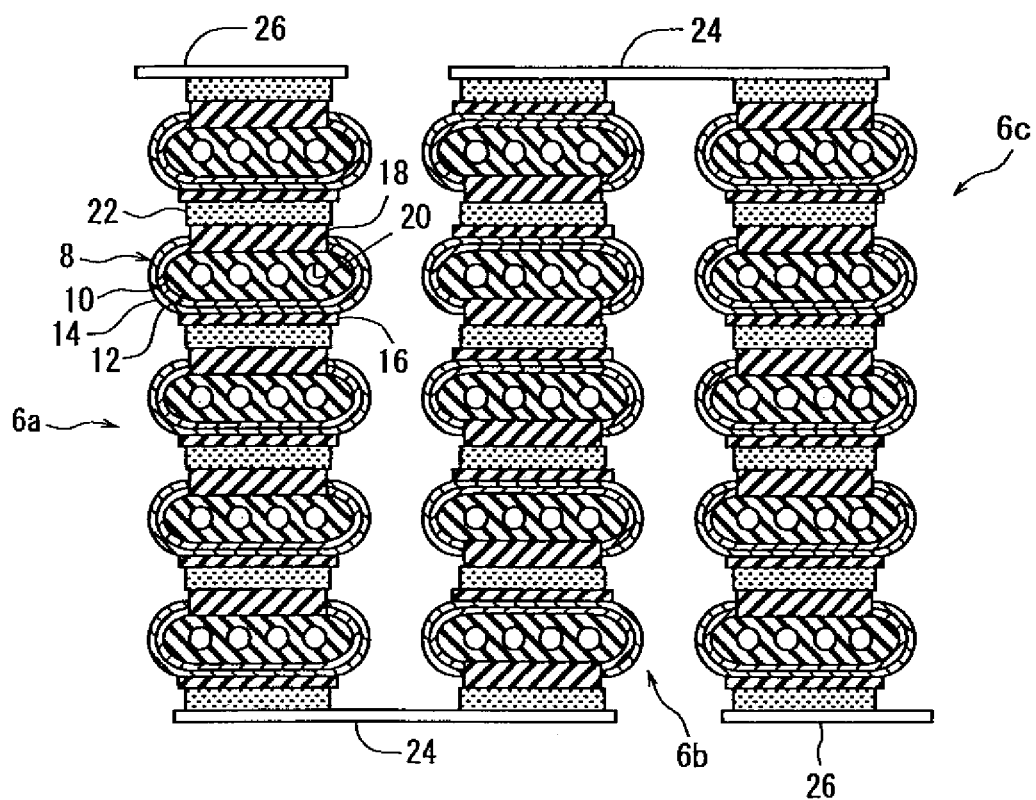
FIG. 2 is a sectional view illustrating fuel cell stacks in the fuel cell system of FIG. 1.

If further described with reference to FIG. 1, power converter means 70 is connected, via current detector means 68, to the fuel cells 8 that are connected in series (FIG. 2). The current detector means 68 detects a direct current value output from the fuel cells 8. Being controlled by the power converter means 70, the direct current is output to the power converter means 70 from the fuel cells 8. The power converter means 70 converts the direct current and supplies an alternating current to a load 72 which is, for example, an electric appliance in a household. The power converter means 70 incorporates voltage detector means 74 which detects the output voltage of the fuel cells 8. In the illustrated embodiment, a system power source 78 which may be a commercial power source is connected to the load 72 through system power detector means 76. The system power detector means 76 detects the electric power fed to the load 72 from the system power source 78.

The fuel cell system constituted according to the present invention, further, includes generation control means 80 and power control means 82. As will be described later in further detail, based on an output current of the fuel cells 8 detected by the current detector means 68, the generation control means 80 controls the flow rate of the fuel gas fed to the fuel cells 8 or, more closely, controls the flow rate control means 40 disposed in the feeder line 36 for feeding the to-be-reformed fuel gas and the flow rate control means 58 disposed in the feeder line 52 for feeding water and, further, controls the flow rate of the oxygen-containing gas or, more closely, controls the blower means 62 disposed in the feeder line 60 for feeding the oxygen-containing gas.

In the fuel cell system constituted according to the present invention, it is important that a fuel gas buffer amount specific to the fuel cells 8 is set to be a fuel gas amount that is needed within a maximum period of increase-needing time (which is about one second in the case of a fuel cell system produced by the present inventors on an experimental basis) until the flow rate of the fuel gas increases to a required amount, i.e., to a maximum amount when the amount of increase in the flow rate of the fuel gas is set to be a maximum, i.e., when the flow rate of the fuel gas is varied from a minimum amount to a maximum amount (in the fuel cell system produced by the present inventors on an experimental basis, the fuel gas buffer amount specific to the fuel cells 8 is an amount corresponding to the fuel gas amount needed in about 3 seconds). As a prerequisite for the above setting, the generation control means 80 and the power control means 82 execute the control operations as described below. In the illustrated embodiment, the fuel gas buffer amount specific to the fuel cells 8 is the fuel gas amount present in the gas passages 20 in the electrode support boards 10 of all fuel cells 8 and in the voids of various porous materials constituting the fuel cells 8. The steam in the fuel gas does not contribute to generating electricity. Therefore, if a ratio $\alpha$ of the steam is subtracted, the fuel gas of $M \times (1-\alpha)$ contributes to generating electricity. Here, M stands for the total volume of the gas passages 20 in the fuel cells 8 and of voids of the porous materials. If the utilization factor of the fuel gas is denoted by U, the utilization factor at the start of feeding into the fuel cells 8 is 0 and the final utilization factor is U. Therefore, the average utilization factor during a time lag t becomes U/2. If converted into an amount of electric charge by taking a mol of volume and the Faraday constant into consideration, the amount of electric charge of the fuel gas buffer amount becomes $M \times (1-\alpha) \times U \times F$ (Faraday constant)/$(2 \times 22.4)$. On the other hand, the required amount of electric charge during the time lag t becomes $W/V \times t/2$. Therefore, $M \times (1-\alpha) \times U \times F$ (Faraday constant)/$(2 \times 22.4) > W/V \times t/2$ may be satisfied.

Figure 3:
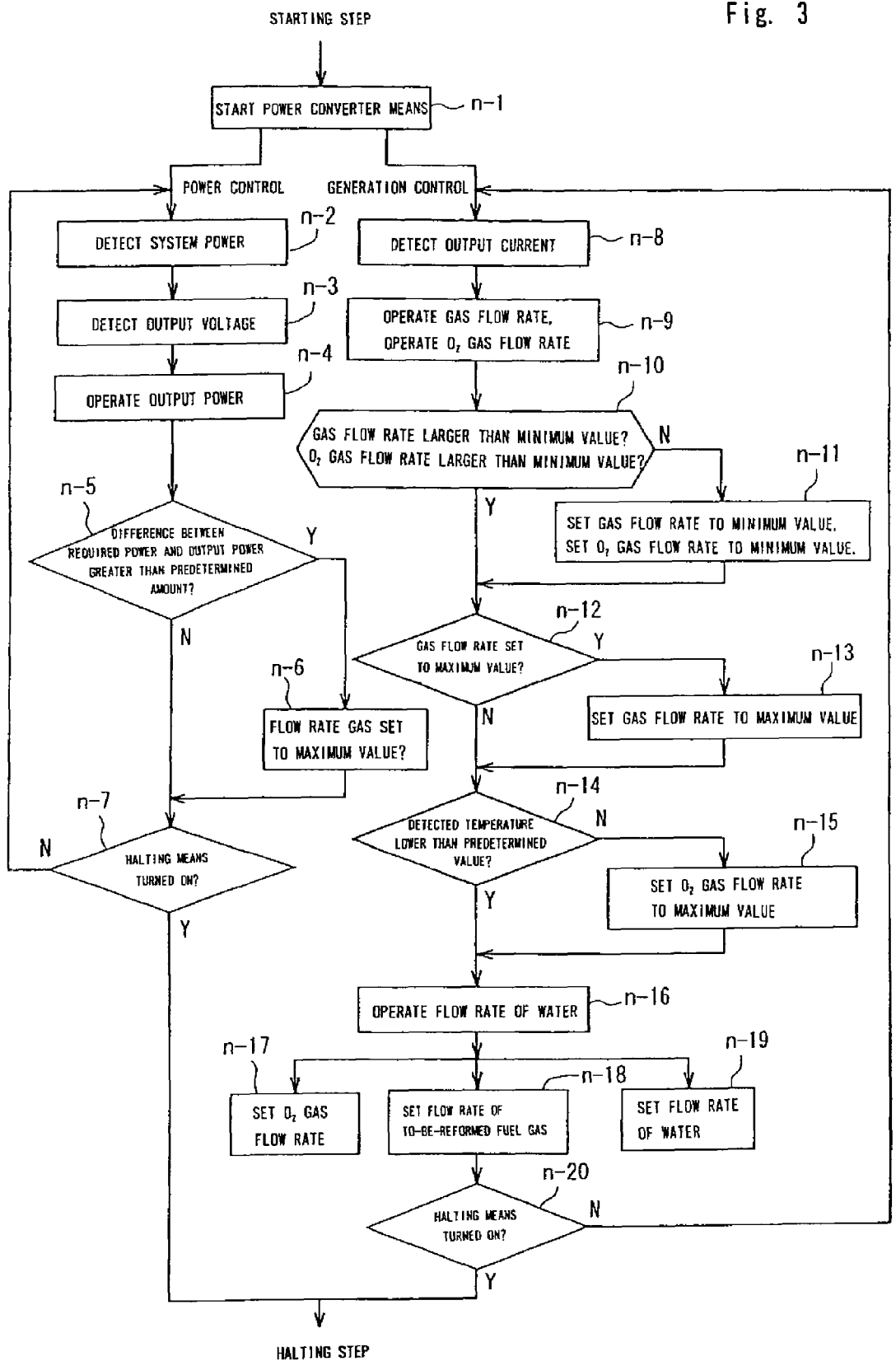
FIG. 3 is a flowchart illustrating a control mode in a state where the fuel cell system of FIG. 1 is normally operating.

A control mode when the fuel cell system is normally operating will now be described with reference to FIG. 3 which is a flowchart. After the end of the required starting operation of the fuel cell system as a result of executing the required starting step (the starting step may be a step taught in the above JP-A-2005-5213 and, particularly, in FIGS. 5 and 6 thereof), the operation shifts to normal operation. At step n-1, the power control means 82 drives the power converter means 70 which, therefore, connects the fuel cells 8 to the load 72. Thus, a DC power is taken out from the fuel cells 8, converted into an AC power and is fed to the load 72. Next, the power control means 82 controls the power converter means 70, and the generation control means 80 controls the generation, i.e., controls the flow rate of the fuel gas and the flow rate of the oxygen-containing gas in parallel therewith.

Figure 4:
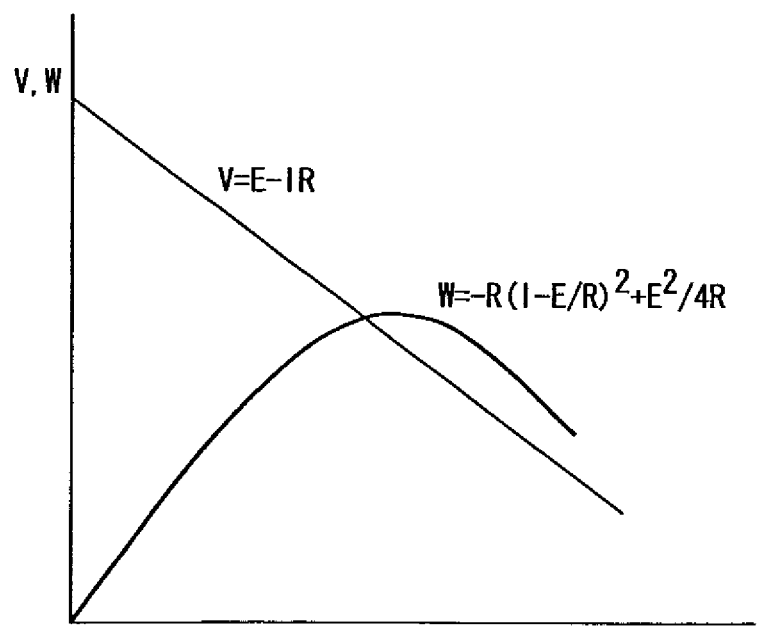
FIG. 4 is a diagram illustrating a relative relationship among the current, voltage and electric power of the fuel cells.

Described below is how to control the power converter means 70 by the power control means 82. At step n-2, the system power detector means 76 detects the electric power that is fed to the load 72 from the system power source 78. Next, at step n-3, the voltage detector means 74 incorporated in the power converter means 70 detects the output voltage of the fuel cells 8, and the routine proceeds to step n-4. At step n-4, the power control means 82 operates the output electric power of the fuel cells 8 based on the electric power detected at step n-2 and on the output voltage detected at step n-3. If described in further detail, the output voltage of the fuel cells 8 is so set that the output of the fuel cells 8 becomes as large as possible or, in other words, that the electric power from the system power source 78 becomes as small as possible. For example, when the electric power fed to the load 72 from the system power source 78 is 800 W and the output capability of the fuel cells 8 is exceeding 800 W, the output power of the fuel cells 8 can be set to be about 700 to about 790 W. It can be contrived to set the output power of the fuel cells 8 to 800 W and to set the electric power from the system power source 78 to be 0 W. In this case, however, it is probable that the so-called reverse current may occur (electric power flows into the system power source 78). It is therefore desired that the lower limit of electric power fed to the load 72 from the system power source 78 is set to be about 10 to about 100 W. In addition, it is desired to maintain the output voltage of the fuel cells 8 to be not less than one-half the open-circuit electromotive voltage E (voltage of when no current is flowing) or, in other words, to maintain the output voltage to be not less than one-half thereof. If this is described in further detail, there exists a relationship V=E−IR between the electric current I and the voltage V of the fuel cells 8 as shown in FIG. 4. R is an internal resistance of the fuel cells 8. A relationship between the electric current I and the electric power W is as given by $W = I \times V = E \times I - I^2 \times R$ and, therefore, $W = -R(I - E/2R)^2 + E^2/4R$. Therefore, W becomes a maximum when $I = E/2R$. The voltage V at this moment is E−IR, i.e., E/2. In FIG. 4, on the left side of a maximum electric power, the electric power increases with an increase in the current I. On the right side of the maximum electric power, on the other hand, the electric power decreases with an increase in the current I. In controlling the flow rate of the fuel gas and the flow rate of the oxygen-containing gas flowing into the fuel cells 8 based on the current I, the generation efficiency becomes high if the control is limited to the left side only of the maximum electric power since the current is smaller than that on the right side. Besides, if the control is limited to the left side only of the maximum electric power, the control mode of the power converter means 70 maintains such a relationship that the output electric power increases with a decrease in the voltage and the output electric power decreases with an increase in the voltage; i.e., a simple control mode can be employed. When the input voltage to the power converter means 70 decreases by more than E/2, the power converter means 70 varies the output current I of the fuel cells 8 to maintain the input voltage of not smaller than E/2. Next, the routine proceeds to step n-5 where the electric power to be fed to the load 72 is compared with the output electric power of the fuel cells 8. When the electric power to be fed to the load 72 is larger than the output power of the cells 8 by more than a predetermined amount, for example, by not smaller than 200 W, the routine proceeds to step n-6 where the power control means 82 sends a signal to the generation control means 80 so as to maximize the flow rate of the fuel gas. In the illustrated embodiment, the cooperation between the power control means 82 and the generation control means 80 is based on the transmission of the above signal only. When the difference between the electric power to be fed to the load 72 and the output power of the fuel cells 8 is not greater than the predetermined value at step n-S, the routine proceeds to step n-7 where it is judged whether halting means (not shown) is turned on for halting the operation of the fuel cell system. When the halting means is not turned on, the routine returns back to step n-1. When the halting means is turned on, predetermined halting step is executed to halt the operation of the fuel cell system (the operation-halting step may be the step taught in the above JP-A-2005-5213, particularly, FIG. 9 thereof).

Next, described below is how to control the generation by generation control means 80. At step n-8, current detector means 68 detects an output current of the fuel cell 8. Next, at step n-9, the flow rate of the fuel gas and the flow rate of the oxygen-containing gas to be fed to the fuel cells 8 are operated based on the output current of the fuel cells 8. The flow rate of the fuel gas (L/min) can be operated as follows:

Flow rate of the fuel gas=$I \times n \times 22.4 \times 60/(F \times H \times \text{average valency}) \times 100$ where I: detected current value,
n: number of the fuel cells,
F: Faraday constant (96484.56)
H: fuel utilization factor (e.g., 70%),
Average valency: average valency of fuel of, for example, city gas. $CH_4$ has a valency of 8
and
$C_2H_6$ has a valency of 14. The valency is averaged by being multiplied by volume percentages thereof in the fuel gas. Multiplication by 100 is for feeding as much by 100/H by taking the fuel utilization factor into consideration.

When the oxygen-containing gas is the air, the flow rate of the oxygen-containing gas (L/min) can be operated as follows:

Flow rate of oxygen-containing gas=$I \times n \times 22.4 \times 60/(F \times A \times \text{valency} \times 0.21) \times 100$ where A: air utilization factor (e.g., 30%),
0.21: ratio of oxygen contained in the air.

Next, at step n-10, it is judged whether the flow rate of the fuel gas and the flow rate of the oxygen-containing gas that are operated are larger than the minimum flow rates. When the amount of generation becomes too small, the temperature drops greatly and it becomes difficult to maintain the normal operation. It is therefore important to feed the fuel gas and the oxygen-containing gas at flow rates not smaller than the predetermined minimum flow rates. When the flow rate of the fuel gas and/or the flow rate of the oxygen-containing gas are smaller than the minimum flow rates, the routine proceeds to step n-11 where the flow rate of the fuel gas and/or the flow rate of the oxygen-containing gas are set to be the predetermined minimum flow rates. When the flow rate of the fuel gas and the flow rate of the oxygen-containing gas are not smaller than the minimum flow rates at step n-10, the routine proceeds to step n-12 where it is judged whether the power control means 82 is transmitting a signal for setting the flow rate of the fuel gas to a maximum value. When the above signal has been transmitted, the routine proceeds to step n-13 where the flow rate of the fuel gas is set to a maximum value. When the signal for setting the flow rate of the fuel gas to the maximum value has not been transmitted at step n-12, the routine proceeds to step n-14 where it is judged whether the temperature detected by temperature detector means (not shown) disposed at a particular portion of the generation chamber 2 is lower than a predetermined temperature, for example, not higher than 830° C. When the detected temperature is exceeding 830° C., the routine proceeds to n-15 where the flow rate of the oxygen-containing gas is set to a predetermined maximum value (this is to cool the interior of the generation chamber 2 by feeding the oxygen-containing gas in a sufficient amount). When the detected temperature is not higher than 830° C. at step n-14, the routine proceeds to step n-16 where the flow rate of water is operated to meet the flow rate of the fuel gas that is operated (or that is set to the minimum value or to the maximum value). Since a mol of water corresponds to 22.4 liters of a gas or 18 cc of a liquid, the flow rate of water (L/min) can be operated, for example, according to the following formula:

Flow rate of water=average carbon number in the fuel$\times$flow rate of fuel gas$\times Z \times 18/22.4$ where Z is a ratio of the amount of carbon in the fuel gas and the amount of steam ($H_2O$), and is, for example, about 2.5.

Next, the routine proceeds to step n-17 where the flow rate of the oxygen-containing gas is set or, in further detail, the operating condition of blower means 62 is so set that a value indicated by a flow meter 64 becomes as operated (becomes the preset minimum value or maximum value). At step n-18, the flow rate of the fuel gas to be reformed is so set as operated (to assume the preset minimum value or maximum value) or, more specifically, flow rate control means 40 is set. At step n-19, flow rate control means 58 is so set that the flow rate of water becomes as operated. Thereafter, the routine proceeds to step n-20 where it is judged whether halting means (not shown) is turned on for halting the operation of the fuel cell system. When the halting means has not been turned on, the routine returns back to step n-8. When the halting means is turned on, predetermined halting step is executed to halt the operation of the fuel cell system.

Attention should be given to the following fact concerning the above-mentioned control mode in the fuel cell system constituted according to the present invention. That is, the cooperation between the generation control means 80 and the power control means 82 is limited to a minimum required degree; i.e., the generation control means 80 and the power control means 82 work independently in most of the control steps. Therefore, the control mode needs to be modified to a minimum degree when, for example, the form of load to which the fuel cell system is attached is to be changed or when a plurality of fuel cell systems are to be provided for a common load, making it possible to realize the fuel cell system very easily and inexpensively.

Though a preferred embodiment of the fuel cell system constituted according to the present invention was described above in detail with reference to the accompanying drawings, it should be noted that the present invention is in no way limited to the above embodiment only and can be varied or modified in a variety of other ways without departing from the scope of the present invention.

The invention claimed is:

1. A method of operating a fuel cell system having a plurality of fuel cells arranged in a generation chamber and a power controller that controls electric power output from the fuel cells, the method comprising:
controlling a flow rate of the fuel gas fed to the fuel cells and a flow rate of the oxygen-containing gas fed to the fuel cells based on an electric current of the fuel cells,
storing a fuel gas buffer amount specific to the fuel cells that is not smaller than a fuel gas amount sufficient to cause a flow rate of the fuel gas to increase from a minimum flow rate to a maximum flow rate, wherein the fuel gas buffer amount is stored inside a constitution of the fuel cells,
supplying the fuel cells with a required amount of the fuel gas from the fuel gas buffer amount without a time lag associated with waiting for the amount of the fuel gas to increase.

2. The method of operating a fuel cell system according to claim 1, increasing the flow rate of the fuel gas to a predetermined maximum value when an electric power output set by the power controller is greater than the electric power generated by said fuel cells by more than a predetermined amount.

3. The method of operating a fuel cell system according to claim 1, further comprising a step of increasing the flow rate of the oxygen-containing gas such that the flow rate is at a predetermined maximum value when a temperature exceeds a predetermined value at a predetermined portion in said generation chamber.

4. The method of operating a fuel cell system according to claim 1, further comprising increasing a DC output voltage of said fuel cells output to a power converter when DC output voltage is smaller than one-half the open-circuit electromotive voltage.

* * * * *